(12) United States Patent
Kanoun et al.

(10) Patent No.: US 8,973,092 B2
(45) Date of Patent: Mar. 3, 2015

(54) METHOD FOR ADAPTING SECURITY POLICIES OF AN INFORMATION SYSTEM INFRASTRUCTURE

(75) Inventors: Wael Kanoun, Nozay (FR); Samuel Dubus, Nozay (FR); Nora Cuppens, Liffre (FR); Frédéric Cuppens, Liffre (FR)

(73) Assignee: Alcatel Lucent, Boulogne-Billancourt (FR)

( * ) Notice: Subject to any disclaimer, the term of this patent is extended or adjusted under 35 U.S.C. 154(b) by 87 days.

(21) Appl. No.: 13/695,822

(22) PCT Filed: May 5, 2011

(86) PCT No.: PCT/EP2011/057252
§ 371 (c)(1),
(2), (4) Date: Nov. 28, 2012

(87) PCT Pub. No.: WO2011/138417
PCT Pub. Date: Nov. 10, 2011

(65) Prior Publication Data
US 2013/0111548 A1 May 2, 2013

(30) Foreign Application Priority Data

May 7, 2010 (EP) .................................... 10290250

(51) Int. Cl.
*H04L 29/06* (2006.01)
*G06F 21/57* (2013.01)

(52) U.S. Cl.
CPC .............. *H04L 63/20* (2013.01); *G06F 21/577* (2013.01); *H04L 63/1433* (2013.01); *H04L 63/1408* (2013.01); *H04L 63/1441* (2013.01)
USPC .......................................................... 726/1

(58) Field of Classification Search
CPC .................................. G06F 17/30; G06F 12/16
USPC .......................................................... 726/1
See application file for complete search history.

(56) References Cited

U.S. PATENT DOCUMENTS 7,818,797 B1 * 10/2010 Fan et al. .......................... 726/22
(Continued)

FOREIGN PATENT DOCUMENTS

WO     2004/015908     2/2004
WO     2007/027131     3/2007

OTHER PUBLICATIONS

Kanoun, W. et al; Success Likelihood of Ongoing Attacks for Intrusion Detection and Response Systems; Computational Science and Engineering, 2009; CSE '09; International Conference ON, IEEE, Piscataway, NJ; USA; Aug. 29, 2009; pp. 83-91; XP031543989; ISBN: 978-1-4244-5334-4.
(Continued)

*Primary Examiner* — Teshome Hailu
*Assistant Examiner* — Thanh Le
(74) *Attorney, Agent, or Firm* — Carmen Patti Law Group, LLC (57) ABSTRACT

The present invention refers to a method for adapting security policies of an information system infrastructure as a function of attacks on the system by storing potential attacks, their associated risks and curative security policies in a data repository, monitoring entering contents representing data streams of the information system, detecting at least one attack in the information system, assessing a success probability parameter of the at least one detected attack and its associated cost impact parameter, assessing an activation impact parameter of at least one curative security policy in response to the at least one detected attack and its associated cost impact parameter, deciding to activate or deactivate a curative security policy based on the success probability parameter of a detected attack, the activation impact parameter of associated curative security policies and the cost impact parameters of both an attack and associated curative security policies.

9 Claims, 4 Drawing Sheets

(56) References Cited

U.S. PATENT DOCUMENTS

| | | | |
|---|---|---|---|
| 8,438,643 B2* | 5/2013 | Wiemer et al. | 726/25 |
| 2007/0028291 A1* | 2/2007 | Brennan et al. | 726/1 |
| 2009/0300045 A1* | 12/2009 | Chaudhry et al. | 707/102 |

OTHER PUBLICATIONS

Miguel, John; Composite Cost/Benefit/Risk Analysis Methodology; Computer Security: A Globabl Challenge; Proceedings/Proceedings of the IFIP International Conference on Computer Security; Jan. 1, 1984; pp. 307-311; XP009139953; ISBN: 978-0-444-87618-8.

* cited by examiner

METHOD FOR ADAPTING SECURITY POLICIES OF AN INFORMATION SYSTEM INFRASTRUCTURE

BACKGROUND OF THE INVENTION

The present invention relates to the field of information system protection and more precisely to the management of security policy in function of attacks undergone or being undergone by the information system.

Infrastructures of information systems need to be protected from harmful attacks leading to malicious events such as intrusions, data thefts, viruses or worms . . . .

Due to the potential number of alerts generated by the existing attack detection systems with large information system infrastructures, it becomes impossible for operators to assess in real-time the risk of an attack and to decide of the suitable response to apply in response to the attack. Thus, automatic deployment of formally defined operational security policies starts to be considered in the protection of telecommunication and information infrastructures.

Figure 1:
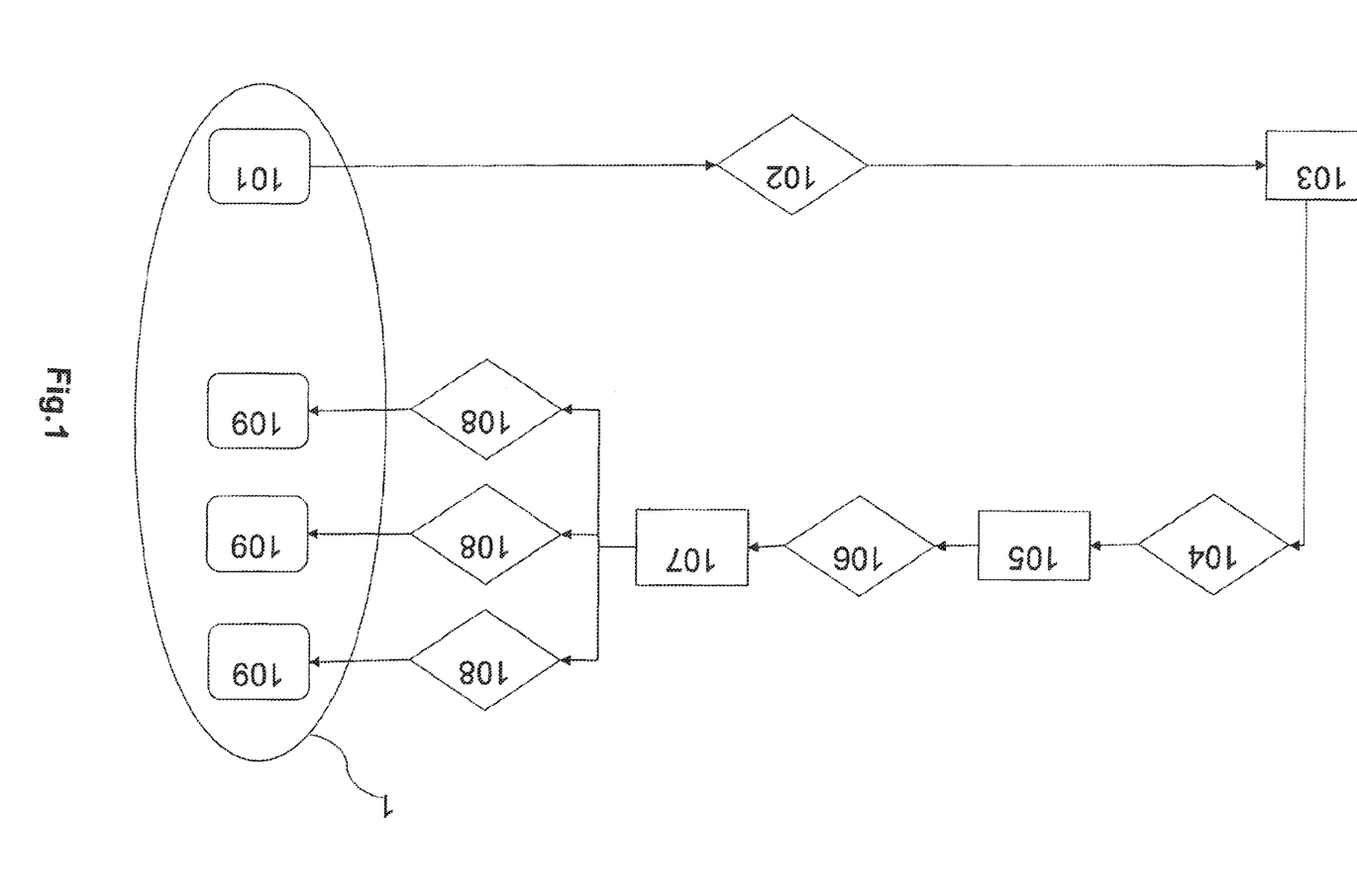
FIG. 1 is a synoptic diagram of the different steps of a protective method for launching security policies against attacks of an information system according to the state of the art.

FIG. 1 represents an example of such automatic protection of the state of the art.

The first step 101 corresponds to the detection of attacks toward the monitored information system which leads to the creation of elementary alerts (102). An alert correlation is then processed (103) to define correlated alerts (104) that are sent to a policy instantiation engine (105) to activate the appropriate security rules (106). These rules are sent to a policy decision point (107) which generates the configuration scripts (108) which are then used to configure policy enforcement points (109). Said policy enforcement points (109) are located in the information system 1 and apply the security rules in response to the detected attacks.

Such configuration of automatic policy activation suffers from drawbacks. Indeed, it is based only on correlated alerts and the number of correlated alerts may reach a very large number (up to thousands within a single day with large system) which would lead to thousands of security policy activations. Moreover, the deactivation of said security policies is not taken into account in the configurations of the state of the art such that a security policy may remain activated even if its impact on the users of the information system 1 is worth than the impact of the attack.

SUMMARY OF THE INVENTION

One object of the present invention is therefore to overcome the precited drawbacks of the state of the art and offer a method that allow to dynamically trig security policy activations only when it is necessary by taking into account a plurality of parameters influencing the activation decision and by defining a method that allow the deactivation of a security policy when it is necessary.

This is achieved by a method for adapting security policies of an information system infrastructure in function of attacks wherein it comprises the steps of:
storing potential attacks and their associated risks in a data repository;
storing curative security policies in response of the potential attacks in a data repository;
monitoring entering contents representing data streams of the information system;
detecting at least one attack in the information system;
assessing a success probability parameter of the at least one detected attack and its associated cost impact parameter;
assessing an activation impact parameter of at least one curative security policy in response to the at least one detected attack and its associated cost impact parameter;
deciding of the activation or deactivation of a curative security policy in function of the success probability parameter of the, at least one, detected attack, of the activation impact parameter of at least one curative security policy and of the cost impact parameters of both the detected at least one attack and the at least one curative security policy.

According to another aspect of the invention, the step of storing potential attacks and their associated risks in a data repository comprises the steps of:
defining the information system topology and attack detection signatures;
defining a risk analysis of the information system that identifies potential attack objectives;
specifying attack models to reach the identified attack objectives;
storing said attack models in a data repository.

According to a further aspect of the invention, the step of storing curative security policies in response of the potential attacks in a data repository comprises:
specifying at least one attack context;
specifying curative security policies corresponding to the specified at least one attack context;
storing said curative security policies in a data repository.

According to an additional aspect of the present invention, the step of assessing a success probability parameter of the at least one detected attack and its associated cost impact parameter comprises:
generating attack strategy graphs based on the stored attack models and the detected at least one attack;
assessing the probability for the attack to reach its objective;
assessing the impact of the attack objective on the system security level and on the system quality of service (QoS) level;
assessing the associated cost impact parameter of the attack objective;

According to another aspect of the present invention, the step of assessing an activation impact parameter of at least one curative security policy in response to the at least one detected attack and its associated cost impact parameter is based on the stored curative security policies and the state of the monitored information system.

According to a further aspect of the invention, the step of deciding of the activation or deactivation of a curative security policy in function of the success probability parameter of the, at least one, detected attack, of the activation impact parameter of at least one curative security policy and of the cost impact parameters of both the detected at least one attack and the at least one curative security policy is applied dynamically based on the evolution of the state of the monitored system.

According to an additional aspect of the invention, the cost impact parameters comprise:
a quality of service (QoS) impact and,
a security level degradation impact.

The present invention also refers to a monitoring and protecting equipment comprising:
at least one data repository for:
storing potential attacks and their associated risks;
storing curative security policies in response of the potential attacks;

processing means for:
   monitoring entering contents representing data streams of the information system;
   detecting at least one attack in the information system;
   assessing a success probability parameter of the detected at least one attack and its associated cost impact parameter;
   assessing at least one activation impact parameter of at least one curative security policy in response to the at least one detected attack and its associated cost impact parameter;
   deciding of the activation of a curative security policy in function of the success probability parameter of the at least one detected attack, of the activation impact parameter of at least one curative security policy and of the cost impact parameters of both the at least one attack and the at least one curative policy,
   activating at least one curative security policy.

The present invention also refers to a monitoring and protecting equipment comprising:
   at least one data repository for:
      storing potential attacks and their associated risks;
      storing curative security policies in response of the potential attacks;
   processing means for:
      monitoring entering contents representing data streams of the information system;
      detecting at least one attack in the information system;
      assessing a success probability parameter of the detected at least one attack and its associated cost impact parameter;
      assessing at least one activation impact parameter of at least one curative security policy in response to the at least one detected attack and its associated cost impact parameter;
      deciding of the deactivation of a curative security policy in function of the success probability parameter of the at least one detected attack, of the activation impact parameter of at least one curative security policy and of the cost impact parameters of both the at least one attack and the at least one curative policy,
      deactivating at least one curative security policy.

DETAILED DESCRIPTION OF THE INVENTION

As used herein, the term "attack" refers to an event in a system that transgress the normal authorized usage of the system or exploits deliberately or accidentally a vulnerability in the system as for example a network scanning, a password cracking, a sending of malicious email (also called spam), a sending of a malformed internet protocol (IP) packet . . . .

Moreover, the expression attack with respect to an information system refers to attacks initiated from outside or inside of the information system (usually from an attacker machine) and directed toward said information system in order to produce dysfunctionings in said system.

As used herein, the term "SIP" refers to the acronym session Internet protocol.

As used herein, the term "IP" refers to the acronym Internet protocol.

As used herein, the term "QoS" refers to the acronym quality of service.

The embodiments of the present invention refer to a method for activating and deactivating security policies in order to protect an information system against malicious attacks wherein not only impacts of the attacks but also the success likelihood for the attack to reach its objective and impacts of security policies are taken into account in the activation/deactivation decision in order to minimize the impact, and in particular the cost, of attacks on the users of the information system.

Figure 2:
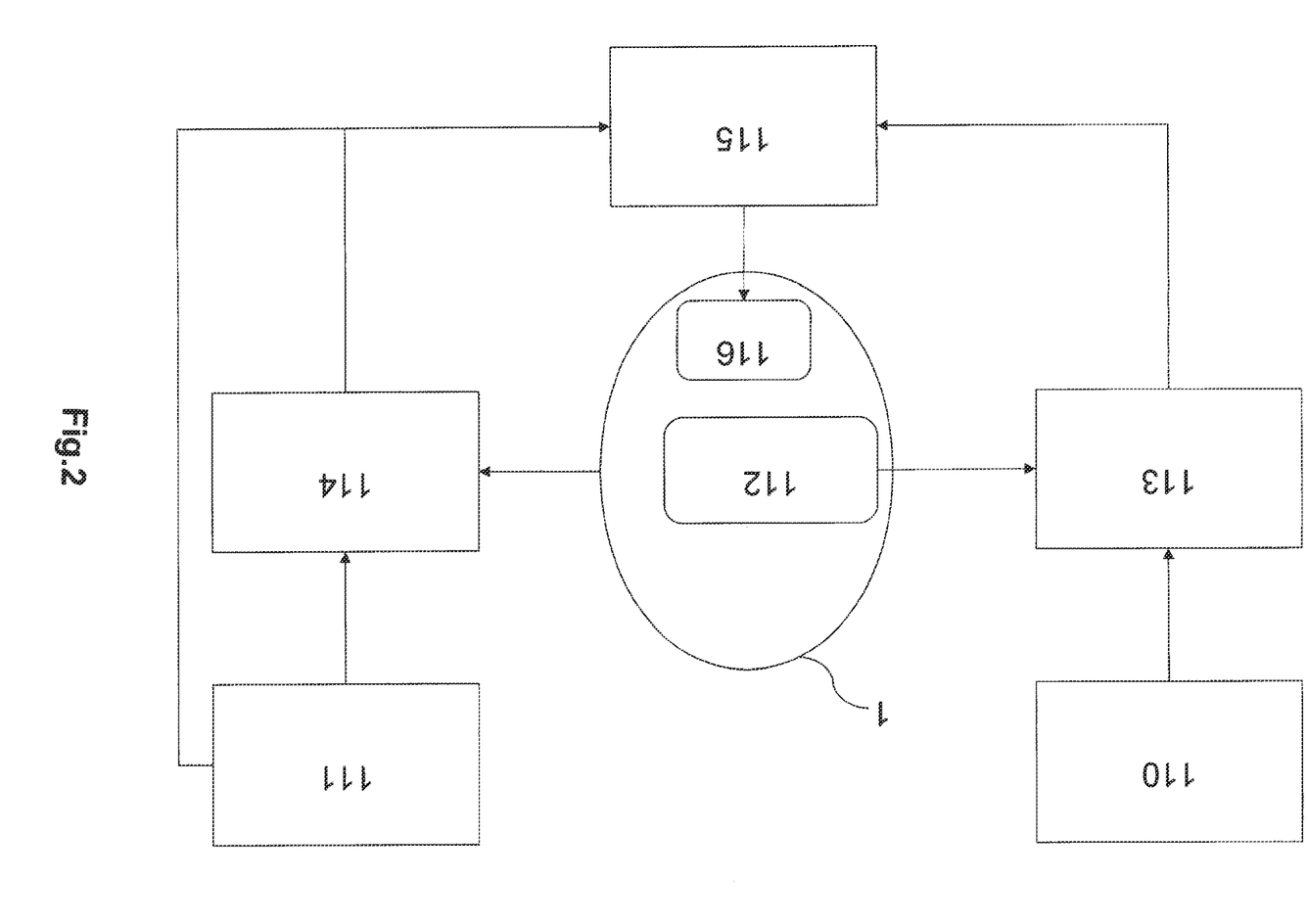
FIG. 2 is a synoptic diagram of the different steps of a protective method for adapting security policies of an information system infrastructure against attacks according to the present invention.

FIG. 2 represents the general steps of the method for adapting the protection of the information system 1.

Step 110 refers to the specification and the storing in a data repository of potential attacks and their associated risks. This first step allows to provide attack models that define the strategy and the objectives of the possible attacks.

Step 111 refers to specification and storing in a data repository of the foreseen security policies to apply in response to the possible attacks defined in the previous step.

Step 112 refers to the monitoring of entering content of the information system 1 corresponding to data streams and the attacks detection.

Step 113 refers to the assessment of a success probability of detected attacks and the cost impact associated with these attacks. Such assessment is achieved based on the attack models stored in step 110 and the attacks detected in step 112.

Step 114 refers to the assessment of the impact of an activation of a curative security policy in response to a detected attack and the cost impact associated with this activation. Such assessment is achieved based on the security policies stored in step 111 and the state of the monitored information system 1.

Step 115 refers to the decision of activating or deactivating a curative security policy in function of the assessments achieved in steps 113 and 114. Such decision corresponds to the comparison of the cumulative impacts of both the attack and the curative security policy on the information system 1.

The activation or deactivation decided in step 115 is then applied in step 116.

Moreover, it has to be noted that the steps 110 and 111 are preliminary steps which can be achieved offline whereas the steps 112, 113, 114, 115, 116 are dynamic steps which are achieved online such that any modification of the information system is taken into account in real time to decide of the activation or the deactivation of security policies.

Thus, the present invention, thanks to the assessments of both the attack consequences and the consequences of the activation of a security policy allows to determine if it is worthy to activate a curative security policy and when said policy is activated to determine if it is worthy to keep this policy activated in function of the evolution of the information system and the impact of this policy on said information system.

As described above, an attack is an event occurring in a system. In practice, an attack comprises different levels (or steps) that lead to the objective of the attack as described in FIG. 3 where an example of attack graph aimed at hacking a voice over internet protocol (VoIP) system is described.

Figure 3:
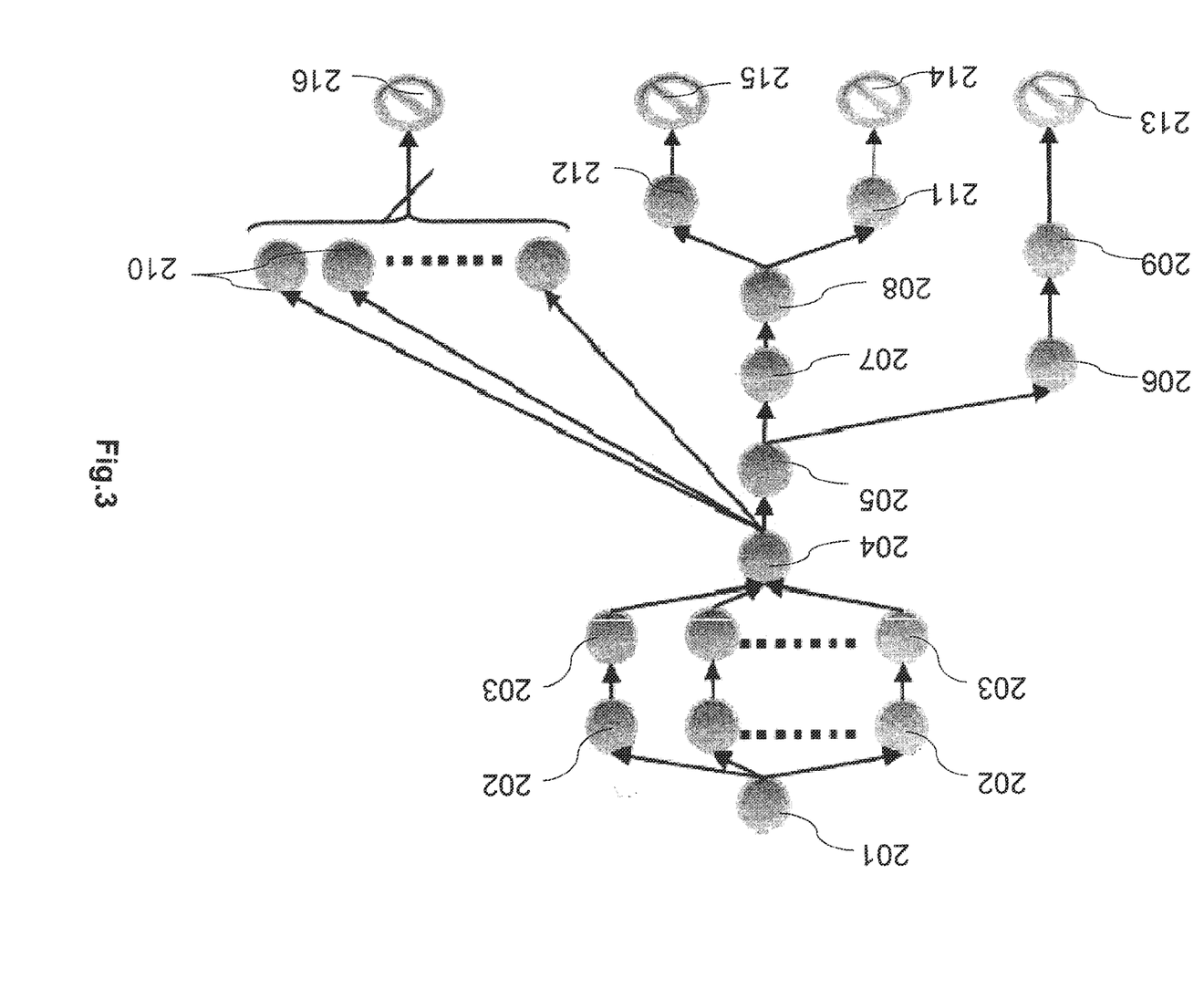
FIG. 3 is a diagram of an example of attack graph comprising the different attack steps and the objectives associated with these attacks.

The first level 201 corresponds to the sending of an email (malicious email or spam) toward a victim machine. Then the below (or next) levels represent the different steps to reach the objectives (213, 214, 215 and 216). The second level 202 refers to the gain of a remote shell in the victim machine (corresponding to the opening by the user of the malicious link or attachment of the email). The third level 203 corresponds to a bot (robot) infection which is the installation of a malicious software bot capable of simulating human activity that uses the remote shell. The bot can wait for future orders from the attacker to execute. As represented in FIG. 3, several remote shells and several corresponding bot infections may be develop in parallel in the information system.

The next level 204 corresponds to the discovery of the session initial protocol (SIP) discovery which is a scanning of the system (or network) to discover machines (computers in general) or servers using SIP protocol. Such attack may be done by a bot.

From this step, the attack may use two different ways depending on its objective.

The first way leads to step 205 which refers to the SIP fingerprinting which consists of identifying the type and the version of the software (operating systems, softphones, servers, etc. . . . ) installed on the SIP entities discovered at the previous level (204). This level may also be performed by a bot.

From step 205, the attack may have two different ways again, one leading to the objective of spam over IP (SPIT) 213 and comprising two levels, a discovery of the active users which is a scanning to determine the users of the VoIP system and which may be performed by a bot and a direct call 209 referring to a call to the victim user (by a bot) to perform spam over IP (SPIT).

The other possibility from level 205 is the discovery of the media access control (MAC) address of potential victim machines 207 (which may be performed by a bot).

The next step 208 is then the address resolution protocol (ARP) poisoning which forces the traffic (e.g. the established calls) between two victim users to pass through one bot. The attacker may then have access to all the traffic between both victim users. This leads either to a step of sniff audio 211 to sniff the audio packets transmitted between both users or a step of inject audio 212 to inject audio packets in the transmission between both users for altering the established call. The corresponding respective objectives being the conversation tapping 214 and the conversation injection 215.

From level 204 the second attack solution consists in a server flooding 210 wherein the bots flood the main server of the VoIP system to cause a denial of service (DoS) which is the objective 216.

It has to be noted that the closer to the objective is the attack, the higher the probability to reach the objective. Thus, when a spam (level 201) is detected, it is generally not worth activating a security policy as the probability for the attack to reach one of the objectives (213, 214, 215 or 216) is still low whereas if the server is flooded (level 210) for example, then the probability of reaching the objective 216 is very high.

The graphs such as presented in FIG. 3 are achieved automatically based on attack models stored in data repository and are used in the assessment of the impact of an attack and its probability to reach its objective as described previously.

Figure 4:
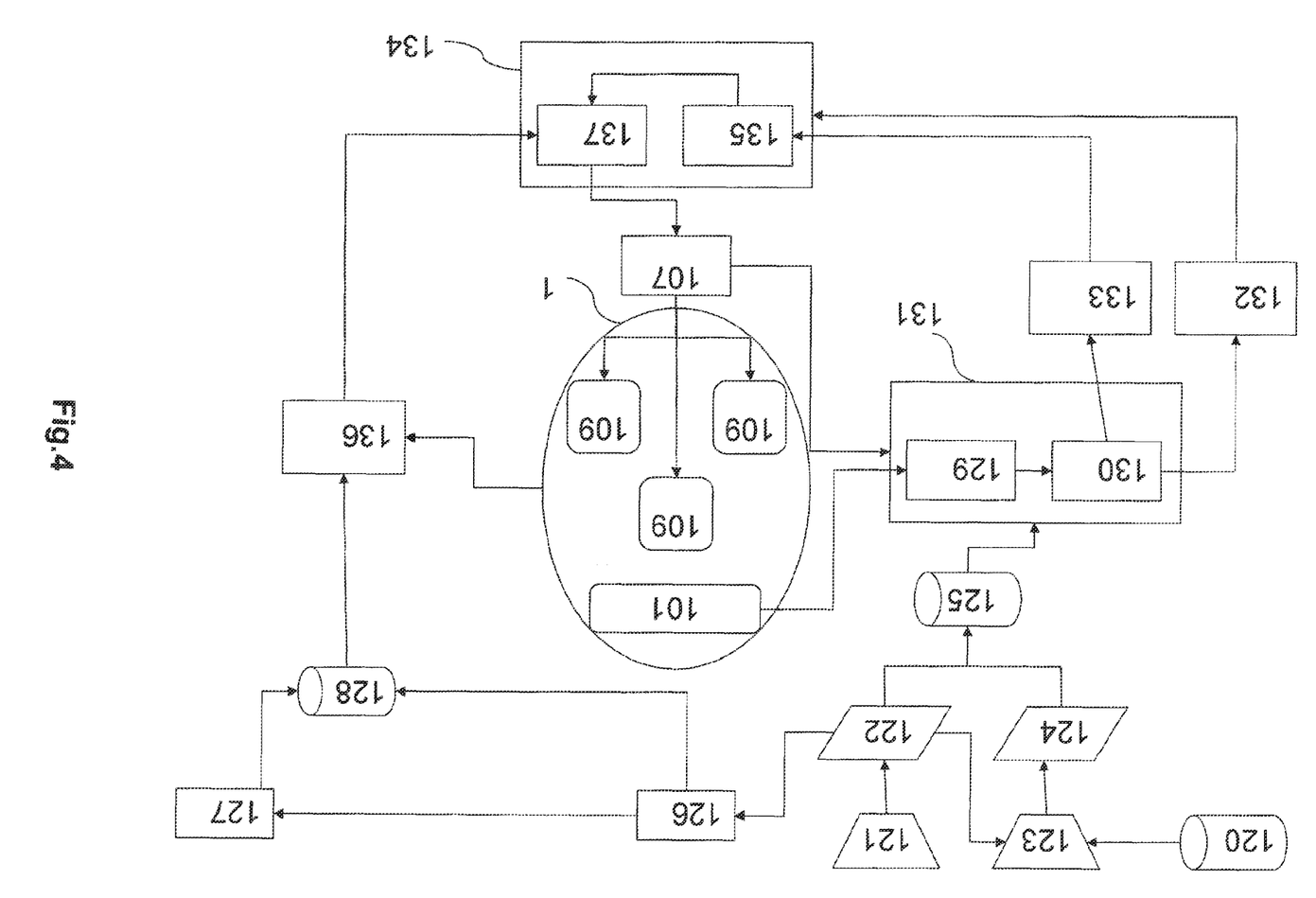
FIG. 4 is a synoptic diagram of the different steps of a detailed protective method for adapting security policies of an information system infrastructure against attacks according to the present invention.

In order to better understand the different steps of the invention, a detailed configuration of a possible embodiment of the invention will now be described based on FIG. 4, it refers to a more detailed presentation of the organization presented in FIG. 2.

Step 120 corresponds to the storing in a data repository of the information system topology and the attack or intrusion detection signatures (IDS). Step 121 is a risk analysis for the monitored system which is conducted by an expert to identify potential attack objectives 122.

Based on these attack objectives and the system topology (stored in step 120), attack models are specified (by an expert) 123 as well as an attack context specification 126. Attack models such as presented in FIG. 4 are then set up 124 and stored as elementary models in a data repository 125.

On the other hand, the specification of attack contexts 126 allows to specify response contexts 127. For each identified attack context an appropriate response context is specified with the associated security rules. Said security rules and attack contexts are stored as security policies in a data repository 128. Said security policies refer, for example, to firewall activation, authentication request activation or user account blocking or any actions allowing to cure the information system or reduce the impact of the attack.

Based on the stored attack models and security policies to apply in response to each attack, the automatic and dynamic part of the invention may be implemented.

The information system 1 is monitored by intrusion detection systems (IDS) 101 which correspond to any types of sensors capable of detecting an attack and of generating and sending alerts. Said sensors may be made of specific electronic devices (micro-controllers, application specific integrated systems (ASICs) . . . ) or in an information technology (IT) environment, it may simply be a software run by a computer, a server or a router.

The alerts sent by the IDS are then aggregated 129 in an online correlation engine 131 which uses these aggregated alerts and the attack models stored in a data repository to generate attack graphs such as presented in FIG. 3. The generated graphs are used, on one hand, for the assessment of the probability for the attack to reach its objective 132 and, on the other hand, for the assessment of the impact of the attack 133.

The determination of the probability to reach the objective corresponds to the success likelihood for an attack to reach an objective. Thus, the success likelihood level of each attainable objective (predefined in the attack graph) of the attack is calculated. This level shows how close the attack is with respect to its objective.

The attack impact assessment corresponds to the determination of the impact of the attack on the security and the quality of service (QoS) of the information system 1. This gathers the impact on the confidentiality, the integrity and the availability and any parameters influencing the using of the information system 1. Such assessment is also based on the state of the information system 1.

The results of both assessments are then sent to a policy instantiation engine (PIE) 134 where the cumulative impact of the attacks is determined.

Besides, in the same way as the assessment of the impact of the attacks, an assessment of the impact of the curative security policies which can be used in response of the attacks 136 is done based on the stored security policies. Again, impact on both the security and the QoS of the information system as well as as the state of said system are taken into account in the assessment. The results of the assessment are also transmitted to the PIE 134 where the cumulative impact of the curative security policies is determined.

The policy instantiation engine 134 receives the assessments corresponding on one side of the attack impact and on the other side of the curative security policy impact which are processed respectively by an attack handler module 135 and a response handler module 137. For each type of impact, at least one metric is defined, and in the general case, a plurality of metrics corresponding to different aspects of the impact (on security, on QoS . . . ) are defined and the assessed value of all these impact contributions are added (practically by integrated their value over time).

Based on both cumulative impacts computed by the attack handler module and the response handler module as well as the probability for the attack to reach its objective (also called success likelihood) and the state of the monitored information system 1, the PIE 134 determines if curative security policies have to be activated or deactivated.

Different activation/deactivation rules may be used, for example, a security policy may be activated if the success likelihood reached a given threshold, or if the attack impact reach a predetermined threshold. It can also be a combination of both (activation if the attack impact and the success likelihood reach given thresholds).

In general, a response policy must be activated when:
the detected threat violated the security and operational policies and,
the success likelihood (calculated dynamically, considering the attack progress and the state of the monitored system) of the threat exceeds a predefined threshold and,
the impact of the threat exceeds a predefined threshold, and is greater than the cost of the associated response policy.

In the same way, if the success likelihood goes below a given threshold or the response impact goes over a predefined threshold or a combination of both, an activated security policy have to be deactivated. Such case may occur if the impact of a response policy induced more drawbacks than advantages with respect to the initial attack or if the risks associated with the attack have been dismissed or eradicated.

The order or command of activating or deactivating a security policy is then sent to response policy deployment point (PDP) 107 (also called policy decision point) wherein each security rule of a response policy is converted into scripts to configure the policy enforcement points (PEP) 109 which are located within the information system 1 and which are used to enforce the security policies (firewall activation or configuration, intrusion prevention systems activations, account permissions or access modifications . . . ).

The online steps (comprising the online correlation engine 131, the attack objective probability assessment 132, the attack impact assessment, the attack response assessment 136, the policy instantiation engine 134, the policy deployment point and the policy enforcement point) may be achieved by programs or software run by a computer or a server. Said online steps use the stored elements of the data repositories (attack model data repository 125 and response policy data repository 128) to determine dynamically the necessity of activation/deactivation of response security policy in function of the detected attacks and of the state of the monitored information system 1.

Thus, the present invention allows to provide a dynamic assessment of the impact of an attack as well as the impact of the security policy to apply in response to the attack providing therefore an optimized efficiency of the use of a security policy. Moreover, the idea of determining conditions for deactivating a security policy allows to improve the reactivity of the information system protection and to avoid an unnecessary degraded use of the information system. Indeed, security policy usually correspond to a degraded mode that limits the effects of the attack but also reduces the capacity of said information system and may disturb and affect the users of the information system leading to a loss of productivity or a reduction of quality of service (QoS) for the company using the information system.

What is claimed is:

1. Method for adapting security policies of an information system infrastructure in function of attacks comprising the steps of:
storing potential attacks and their associated risks in a data repository implemented in a hardware storage device;
storing curative security policies in response of the potential attacks in a data repository said method further comprising the steps, implemented in a hardware processing means, of;
monitoring entering contents representing data streams of the information system;
detecting at least one attack in the information system;
assessing a success probability parameter of the at least one detected attack and its associated cumulative cost impact parameter, further comprising the steps of generating attack strategy graphs based on the stored potential attacks and the detected at least one attack; and assessing the probability for the detected attack to reach its objective;
assessing an activation impact parameter of at least one curative security policy in response to the at least one detected attack and its associated cumulative cost impact parameter;
deciding of the activation or deactivation of a curative security policy in function of the success probability parameter of the, at least one, detected attack, of the activation impact parameter of at least one curative security policy and of the cumulative cost impact parameters of both the detected at least one attack and the at least one curative security policy.

2. Method for adapting security policies of an information system infrastructure in accordance with claim 1 wherein the step of storing potential attacks and their associated risks in a data repository further comprises the steps of:
defining the information system topology and attack detection signatures;
defining a risk analysis of the information system that identifies potential attack objectives;
specifying attack models to reach the identified attack objectives; and
storing said attack models in a data repository.

3. Method for adapting security policies of an information system infrastructure in accordance with claim 1 wherein the step of storing curative security policies in response of the potential attacks in a data repository further comprises the steps of:
specifying at least one attack context;
specifying curative security policies corresponding to the specified at least one attack context; and
storing said curative security policies in a data repository.

4. Method for adapting security policies of an information system infrastructure in accordance with claim 1 wherein the step of assessing a success probability parameter of the at least one detected attack and its associated cost impact parameter further comprises the steps of:
assessing the impact of the attack objective on the system security level and on the system quality of service (QoS) level; and
assessing the associated cost impact parameter of the attack objective.

5. Method for adapting security policies of an information system infrastructure in accordance with claim 1 wherein the step of assessing an activation impact parameter of at least one curative security policy in response to the at least one detected attack and its associated cost impact parameter is based on the stored curative security policies and the state of the monitored information system.

6. Method for adapting security policies of an information system infrastructure in accordance with claim 1 wherein the step of deciding of the activation or deactivation of a curative security policy in function of the success probability parameter of the, at least one, detected attack, of the activation impact parameter of at least one curative security policy and of the cost impact parameters of both the detected at least one attack and the at least one curative security policy is applied dynamically based on the evolution of the state of the monitored system.

7. Method for adapting security policies of an information system infrastructure in accordance with claim 1 wherein the cost impact parameters comprise:
- a quality of service (QoS) impact and,
- a security level degradation impact.

8. Monitoring and protecting equipment comprising:
- at least one data repository implemented in a hardware storage device for:
  - storing potential attacks and their associated risks;
  - storing curative security policies in response of the potential attacks;
- hardware processing means for:
  - monitoring entering contents representing data streams of the information system;
  - detecting at least one attack in the information system;
  - assessing a success probability parameter of the detected at least one attack and its associated cumulative cost impact parameter;
  - assessing at least one activation impact parameter of at least one curative security policy in response to the at least one detected attack and its associated cumulative cost impact parameter, further comprising the steps of generating attack strategy graphs based on the stored potential attacks and the detected at least one attack; and assessing the probability for the detected attack to reach its objective;
  - deciding of the activation of a curative security policy in function of the success probability parameter of the at least one detected attack, of the activation impact parameter of at least one curative security policy and of the cumulative cost impact parameters of both the at least one attack and the at least one curative policy; and
  - activating at least one curative security policy.

9. Monitoring and protecting equipment comprising:
- at least one data repository implemented in a hardware storage device for:
  - storing potential attacks and their associated risks;
  - storing curative security policies in response of the potential attacks;
- hardware processing means for:
  - monitoring entering contents representing data streams of the information system;
  - detecting at least one attack in the information system;
  - assessing a success probability parameter of the detected at least one attack and its associated cumulative cost impact parameter, further comprising the steps of generating attack strategy graphs based on the stored potential attacks and the detected at least one attack; and assessing the probability for the detected attack to reach its objective;
  - assessing at least one activation impact parameter of at least one curative security policy in response to the at least one detected attack and its associated cumulative cost impact parameter;
  - deciding of the deactivation of a curative security policy in function of the success probability parameter of the at least one detected attack, of the activation impact parameter of at least one curative security policy and of the cumulative cost impact parameters of both the at least one attack and the at least one curative policy; and
  - deactivating at least one curative security policy.

* * * * *